United States Patent [19]
Bunce et al.

[11] Patent Number: 5,608,578
[45] Date of Patent: Mar. 4, 1997

[54] METHOD AND APPARATUS FOR PROVIDING CLEAN APERTURE THROUGH SYMBOLOGY READER WINDOW

[75] Inventors: Steven M. Bunce, Mill Creek; Joel T. Aragon, Everett, both of Wash.

[73] Assignee: Intermec Corporation, Everett, Wash.

[21] Appl. No.: 284,823

[22] Filed: Aug. 2, 1994

[51] Int. Cl.⁶ .............. G02B 27/00; B60J 1/00; G06K 7/00; E06B 3/24
[52] U.S. Cl. ............ 359/609; 156/108; 235/435; 235/472; 428/34; 428/346
[58] Field of Search ................. 359/601, 609, 359/436, 359, 883, 884, 894; 428/13, 14, 34, 201, 202; 235/448, 472, 435, 462; 156/108

[56] References Cited

U.S. PATENT DOCUMENTS

| | | | |
|---|---|---|---|
| 5,148,009 | 9/1992 | Lindacher | 235/472 |
| 5,239,406 | 8/1993 | Lynam | 359/275 |
| 5,270,084 | 12/1993 | Parker | 428/34 |
| 5,504,350 | 4/1996 | Ortyn | 235/462 |

*Primary Examiner*—Paul M. Dzierzynski
*Assistant Examiner*—Audrey Chang
*Attorney, Agent, or Firm*—Seed and Berry LLP

[57] ABSTRACT

A method and window for providing a clean aperture at the reading face of a symbology reader. The window includes a layered structure including laminar sheets of optically transmissive material overlaying a window base and the adjacent laminar sheets. Each laminar sheet is releasably bonded to the window base. In use, when the outermost laminar sheet is damaged, it is peeled away to reveal the clean sheet beneath. In one embodiment, each laminar sheet includes an integral grasping tab projecting outwardly. The grasping tabs in each successive sheet are offset to permit a user to grasp the single tab corresponding to the outermost laminar sheet to peel it away. In one embodiment, a flexible boot covers an edge portion of the window to protect the window structure and retain the laminar sheets from being inadvertently peeled off. In one embodiment, the grasping tabs are replaced with recesses to provide access for gripping subsequent sheets.

34 Claims, 6 Drawing Sheets

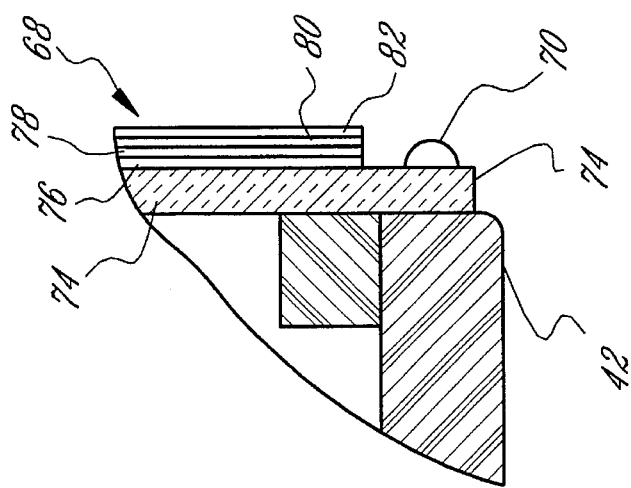
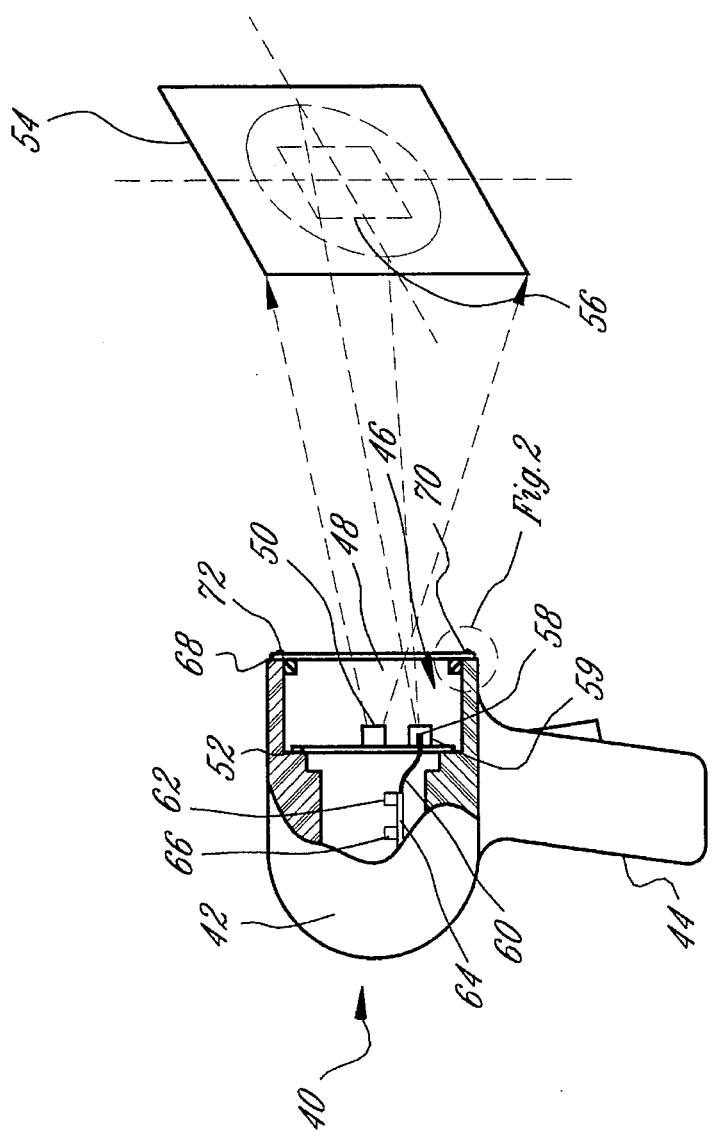

METHOD AND APPARATUS FOR PROVIDING CLEAN APERTURE THROUGH SYMBOLOGY READER WINDOW

TECHNICAL FIELD

The present invention relates to optical windows for symbology readers.

BACKGROUND OF THE INVENTION

Symbology readers utilize transmitted and reflected light to read symbologies of various kinds. For example, such symbologies may be linear symbologies such as bar codes, or may be multirow or stacked symbologies, such as PDF-417 or Code 49, or multilayer codes. Such symbologies may also include other types, such as "area" symbologies having a matrix of data cells, rather than one or more rows of bars and spaces.

Typically, light is generated by a light source, such as a laser or light emitting diode ("LED") within the reader. The light from the source is directed outwardly through a reader aperture in the reader toward a target object bearing the symbology. Light from the reader aperture strikes the symbology and is reflected. Because the symbology is a pattern of varying reflectances, light is reflected in a pattern corresponding to the reflectance pattern of the symbology. Light reflected from the symbology travels back to the symbology reader where it enters the reader through the aperture. There the reflected light is detected by an optical detector such as a CCD array within the reader. The detector generates an electrical signal corresponding to the pattern of reflectivity of the symbology. This electrical signal is then decoded by a microprocessor and electronics in the reader to determine the information represented by the symbology.

Typically, the reader aperture includes a transparent or color selective plate or window through which the light passes as it travels to and from the symbology. The window may also include other optical elements such as a polarizer. The window protects the interior of the reader from contaminants, such as dirt and moisture. Where the window is color selective, it also acts as a filter to remove light at undesirable wavelengths to improve the operation of the detector.

Ideally, the window transmits light unaffected at the wavelength at which the detector operates. While this may be realized by a clean, transparent or color selective plastic or glass window, such windows often become contaminated or damaged during use. Most commonly, the windows become scratched as the reader is used in the field or contaminants become stuck to an outer surface of the window.

When the window becomes sufficiently scratched or contaminated, its effectiveness at transmitting light becomes impaired. In some cases, the damage or contamination causes light to be absorbed or reflected. Even where the light is transmitted, it may be diffused or redirected, causing light to miss the detector, or to strike the detector improperly. This problem is especially significant in a CCD array detector, where redirected light may strike an improper region of the detector. Such misdirected light can cause the detector to incorrectly indicate the relative reflectances of regions of the symbology, thereby causing the reader to fail to decode the symbology or to decode the symbology incorrectly.

In conventional readers, damage or contamination to the window typically involves replacement of the window. Many times, this requires the reader to be partially disassembled to remove the window and insert a replacement window. Often this forces the reader to be out of service for a period of time. In some cases, it may even involve returning the reader to a service facility.

SUMMARY OF THE INVENTION

A window for a symbology reader is described for a reader including a reading face with an optical aperture therethrough a base for attachment to the reader at its reader face, the base having an optically transmissive first region; an optically transmissive first laminar sheet overlaying the first region of the base, the first laminar sheet being removably secured to the base; and an optically transmissive second laminar sheet overlaying the first region of the base and the first laminar sheet outward of the first laminar sheet, the second laminar sheet being removably secured to the base. The laminar sheets have indices of refraction substantially equal to the index of refraction of the base.

The first laminar sheet and second laminar sheet are adhered to the base by an optically transmissive adhesive. Each of the first and second laminar sheets includes a corresponding tab projecting outwardly from a location at its perimeter, the tab being formed integrally with its respective laminar sheet. In one embodiment, the tabs are offset laterally along one edge of the perimeter. Intermediate the first and second laminar sheets are a plurality of spacer nubs to maintain the laminar sheets in a spaced-apart relationship. The spacer nubs are distributed over a first region of the base with a first density of nubs per unit area. In a second region of the base, the nubs are distributed with a different density.

In one embodiment the density in the second region is zero nubs per unit area. A third laminar sheet overlays the first and second laminar sheets and is removably secured to the second laminar sheet. Another set of spacer nubs is positioned intermediate the second laminar sheet and the third laminar sheet.

A reader having a reading face with an aperture therethrough is also described. The reader includes a reader housing, a base engaging the housing at its reading face, the base having an optically transmissive first region; a window retainer attached to the reader at the reader face for retaining the base in engagement with the reader; an optically transmissive first laminar sheet overlaying the first region of the base and being releasably secured to the base; and an optically transmissive second laminar sheet overlaying the first region of the base and the first laminar sheet, outwardly of the first laminar sheet, the second laminar sheet being removably secured to the first laminar sheet outward of the first laminar sheet.

The reader also includes corresponding integral tabs projecting outwardly from a location at the perimeter of each of the laminar sheets, the tabs being laterally offset from each other. A window retainer engages the reader and projects inwardly to overlay an edge region of the base to hold the base in engagement with the reader. The window retainer is a flexible boot engaging a perimeter portion of the window.

A window according to the invention is mountable to a symbology reader having a reading face with an optically transmissive region therein and an optical detector aligned to receive light through the optically transmissive region. The window comprises an optically transmissive base and a stack, including a plurality of optically transmissive laminar sheets supported by the base, the laminar sheets arranged to be removed sequentially from the base. Each of the laminar sheets includes a grasping aid, which is a grasping tab formed integrally with the respective laminar sheet. The window also includes spacer nubs intermediate adjacent ones of the laminar sheets to maintain the laminar sheets in a spaced-apart relationship.

In a method according to the invention, a symbology reader is produced having a housing with a reading face having an optical aperture therethrough. The method includes mounting a base to the housing at its reader face, the base having an optically transmissive first region; releasably securing an optically transmissive first laminar sheet over the first region of the base; and releasably securing an optically transmissive second laminar sheet over the first region of the base and the first laminar sheet, outwardly of the first laminar sheet.

The second laminar sheet includes a tab projecting outwardly from the second laminar sheet and the step of removing the second laminar sheet comprises the steps of grasping the tab and pulling the tab to peel away the second laminar sheet. The first laminar sheet also includes a tab projecting outwardly from its perimeter and the step of securing the second laminar sheet over the first region of the base comprises positioning the second laminar sheet parallel to the first laminar sheet and aligned such that the tab projecting from the second laminar sheet is offset from the tab projecting from the first laminar sheet; and bringing the second laminar sheet into contact with the first laminar sheet with a bonding agent therebetween.

The method also includes securing an optically transmissive third laminar sheet over the first region of the base and aligning a window retainer having a lip projecting inwardly toward the center of the reading face with the lip overlaying edge portions of the first and second laminar sheets; and attaching the window retainer to the reader to protect the edge portions thereby. The window retainer is a flexible boot having a boot aperture therethrough and the step of aligning the window retainer to the reader includes aligning the boot to the reader face with the boot aperture exposing a central portion of the first region. The step of attaching the window retainer to the reader includes flexing the boot to engage an outer perimeter of the reading face.

BRIEF DESCRIPTION OF THE DRAWINGS

FIG. 1 is a side view and partial cross-section of a symbology reader, including a window according to the present invention.

FIG. 2 is a fragmentary view of the reader of FIG. 1 showing a laminar window structure.

DETAILED DESCRIPTION OF THE INVENTION

Figure 3:
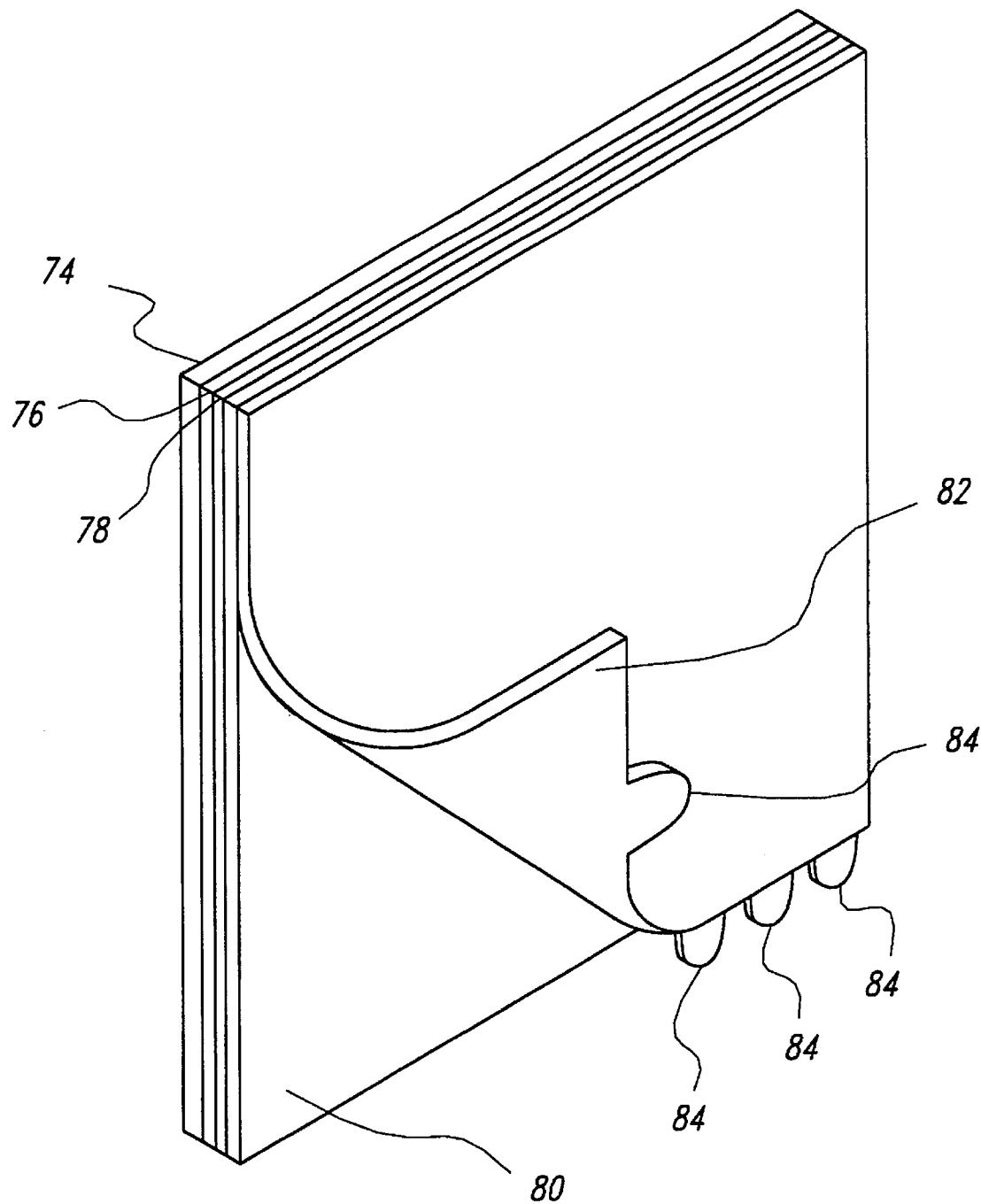
FIG. 3 is an isometric view of the window structure of FIG. 2 separate from the reader with one laminar window layer partially peeled away.

As shown in the drawings for purposes of illustration, the present invention is embodied in a symbology reader 40 which includes a head portion 42 and a handle 44. The reader 40 has a reader aperture 46 in a reading face 48 to provide a passageway for light to enter and exit the head portion 42 of the reader.

An illumination source 50 is mounted to a printed circuit board 52 which is mounted within the head portion 42 and is oriented to emit light outwardly through the reader aperture 46. The illumination source 50 is typically a laser diode, an LED, or an array of LEDs. Light from the illumination source 50 exits the head portion 42 through the reader aperture 46 and illuminates a target object 54 bearing a symbology 56, as indicated by the arrows. The symbology 56 is a pattern of regions of varying reflectance that reflects some of the light from the illumination source 50 back toward the reading face 48 of the reader 40. Several types of symbologies are known. Examples include linear symbologies such as bar codes, two-dimensional symbologies, such as PDF-417 and Code 49, and area symbologies, such as Code 1.

The light reflected by the symbology 56 enters the head portion 42 through the reader aperture 46 and is detected by an optical detector 58 within a detector assembly 59. The detector assembly 59 includes optical elements such as lenses, filters, and apertures within a mounting fixture.

Because the symbology 56 is a pattern of regions of differing reflectance, the reflected light received by the detector assembly 59 will correspond to the pattern of reflectances within the symbology 56 and will be focused upon the detector 58 by the detector assembly 59.

The optical detector 58, upon detecting the light reflected from the symbology 56, generates an electrical signal which is carried by a cable 60 to a microprocessor 62 on a controller printed circuit board 64. The microprocessor 62, in conjunction with conventional electronics 66 on the printed circuit board 64 decodes the electrical signal from the optical detector 58 to determine information represented by the symbology 56.

A window 68 advantageously covers the reader aperture 46 to protect the devices mounted within the head portion 42 of the reader 40 from contamination and damage. The window 68 is mounted using fasteners 70, 72. Alternatively, the window 68 may be mounted using various other techniques, including retention by a flexible boot as will be described below with respect to FIG. 6.

Figure 5:
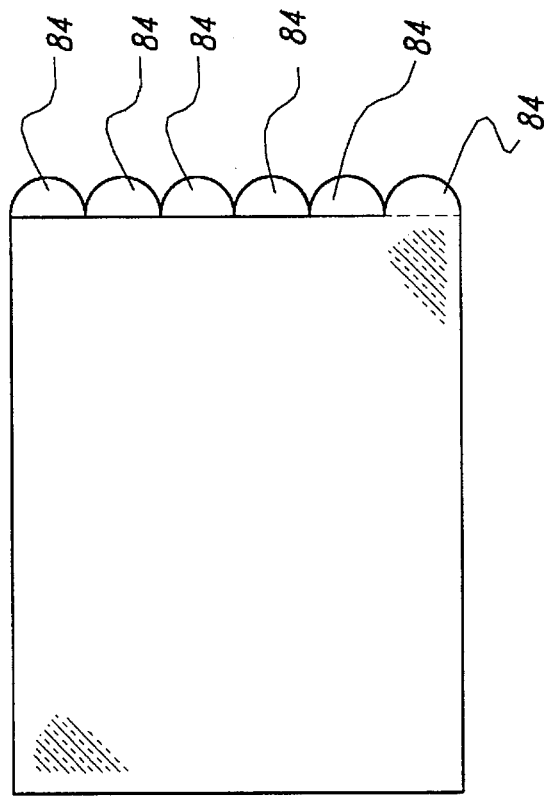
FIG. 5 is a front elevational view of the laminar window of FIG. 4 showing the relative positioning of the offset grasping tabs when the window is assembled.
Figure 4:
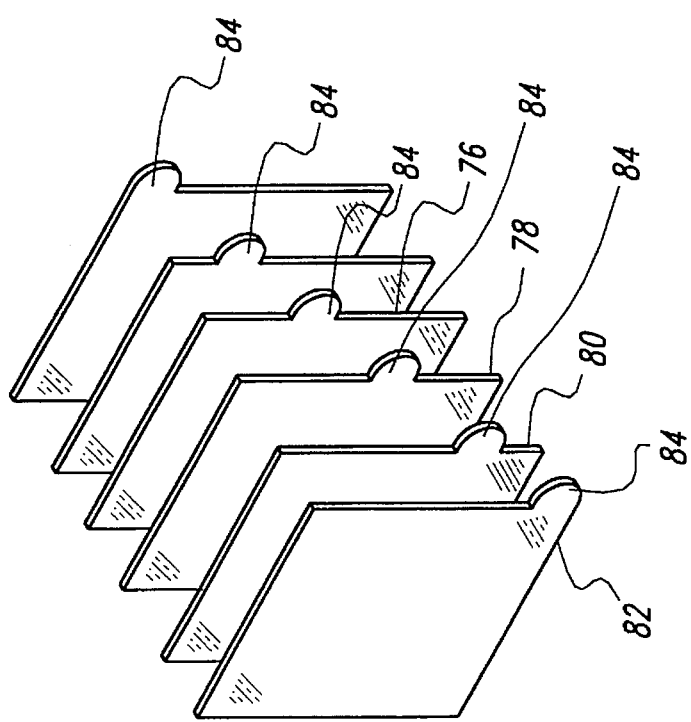
FIG. 4 is an exploded view of the laminar window structure of FIG. 3 shown separately from the base of the window.

As best seen in FIG. 2, the window 68 is a laminar structure, including a planar base 74 and several laminar sheets 76, 78, 80, 82 bonded thereto using an optically transparent adhesive. While only four sheets are shown and described, embodiments having fewer or more sheets are within the scope of the invention. For example, the structures of FIGS. 4 and 5 have six laminar sheets. The laminar sheets 76, 78, 80, 82 are thin sheets, approximately 0.003 inch in thickness, and have an index of refraction chosen to minimize optical distortion. Typically, the index of refraction will be chosen to be as low as possible to minimize any lengthening effect it may have on the optical path from the front surface of the window to the detector assembly 59. The minimization of effect on the optical path minimizes any shifting of the effective focal plane of the detector assembly 59 due to the presence of the window 68. As such, the reflected light from the symbology 56 will be properly focused on the detector 58 of the detector assembly 59.

Bonding of the laminar sheets 76, 78, 80, 82 to the base 74 is not permanent. Instead, the optically transparent adhesive is selected to provide sufficient adhesion to prevent the laminar sheets from being displaced through normal use while permitting the laminar sheets to be easily peeled away by a user. While an optically transparent adhesive is preferred, the laminar sheets can be attached to the base 74 and/or to each other in any releasable fashion that does not substantially obstruct the passage of light through the window 68.

FIG. 3 shows the window structure removed from the reader 40 for clarity. As shown, the outermost sheet 82 is partially peeled away to reveal the next sheet 80. To facilitate the peeling away of the laminar sheets 76, 78, 80, 82, each has a grasping tab 84 projecting outwardly from an edge 89 of the laminar sheet. The grasping tab 84 is an integral extension of its corresponding laminar sheet 76, 78, 80, and 82. Preferably, each successive grasping tab 84 is offset laterally slightly from the grasping tab 84 of its immediately adjacent neighbors when the laminar sheets are mounted on the base 74. This provides access for the user to more easily grasp a single tab, as can best be seen in the six-sheet structure of FIGS. 4 and 5. Because it is desirable to make the grasping tab 84 easily accessible to the user, the adhesive is confined to a central region of the corresponding laminar sheet 76, 78, 80 or 82 within its perimeter.

The reader 40 is typically used by an operator in several locations. As the reader is carried and used, the outermost laminar sheet 82 will eventually become damaged or contaminated, most likely by being scratched. When the outermost laminar sheet 82 becomes sufficiently damaged, transmission of light through the window 68 is impaired. This, in turn, impairs the operation of the reader 40 by reducing the light directed toward the symbology 56 and by reducing the light reflected from the symbology which reaches the detector assembly 59. The sensitivity of the reader 40 is thereby reduced, making reading difficult or impossible. When the operator perceives that reading is impaired, the operator simply grasps the tab 84 of the outermost laminar sheet 82 and peels the sheet away as is shown happening in FIG. 3. This reveals the next laminar sheet 80, making it the outermost sheet. Having been covered and protected by the now-removed laminar sheet 82, the new outermost laminar sheet 80 is clean and undamaged.

Figure 6:
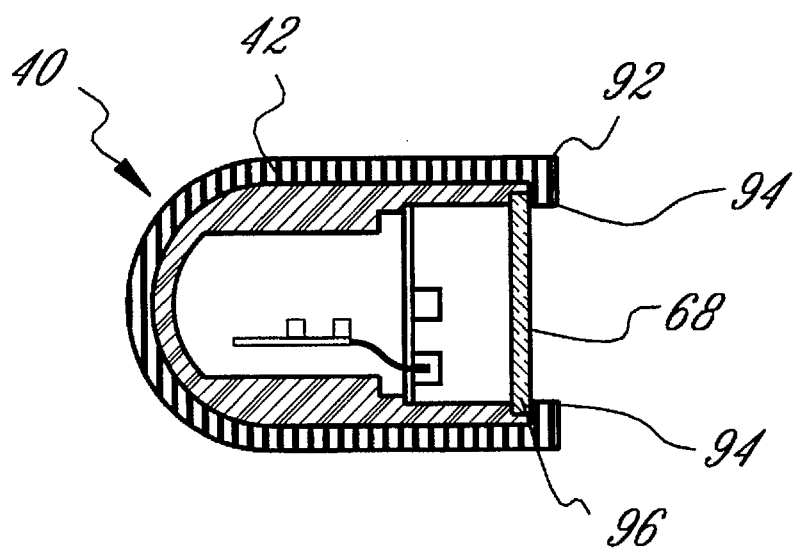
FIG. 6 is a side cross-sectional view of an alternative embodiment of the head portion of FIG. 1 which includes a flexible boot.

In another embodiment, shown in FIG. 6, a flexible rubber boot 92 surrounds part of the head portion 42. A lip 94 integral to the boot 92 projects over an edge region 96 of the window 68, covering a perimeter portion of the laminar sheets 76, 78, 80, 82. The boot 92 provides some shock protection to the reader 40 and the lip minimizes inadvertent removal of the laminar sheets 76, 78, 80, 82 by preventing the perimeter region from being peeled back unintentionally. This is particularly important along the edge from which the grasping tabs 84 project. This prevents the grasping tabs 84 from catching on objects when the reader 40 is moved past them.

Figure 7:
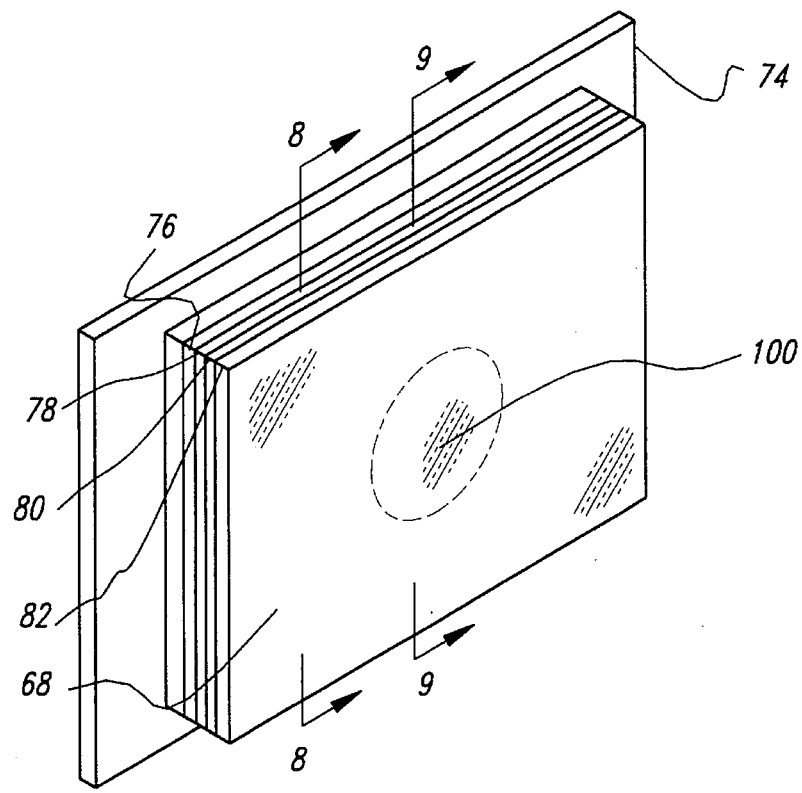
FIG. 7 is an isometric view of an alternative embodiment of the laminar window structure of FIG. 1.
Figure 8:
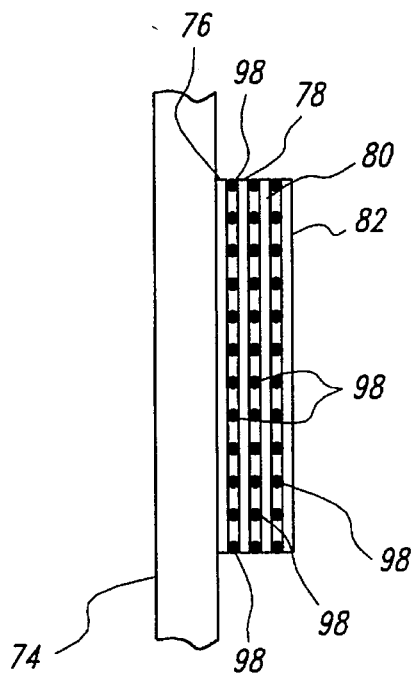
FIG. 8 is a fragmentary, cross-sectional view of the window structure of FIG. 7 taken substantially along line 8—8.
Figure 9:
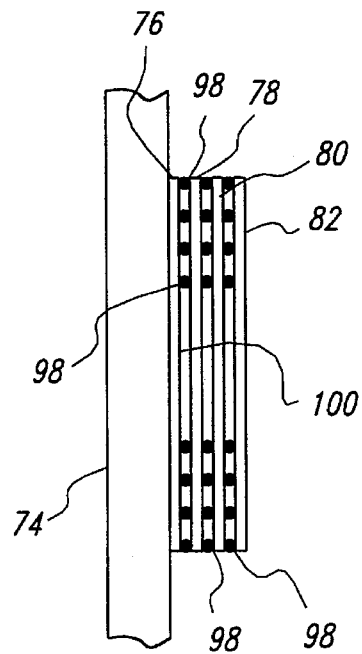
FIG. 9 is a fragmentary, cross-sectional view of the window structure of FIG. 7 taken substantially along line 9—9.

An alternative embodiment of the window 68 is shown in FIGS. 7, 8 and 9. In this embodiment, the window 68 includes spacer nubs 98 positioned between adjacent laminar sheets 76, 78, 80, 82 to prevent contact between adjacent sheets. By keeping adjacent sheets spaced apart, the spacer nubs 98 prevent the occurrence of optical distortions, such as Newton rings, which may be caused by contact between laminar sheets 76, 78, 80, 82. The spacer nubs 98 are preferably made of transparent material such as an optically transparent epoxy to reduce optical distortion caused by the nubs 98. The spacer nubs 98 are printed, using conventional screen printing techniques on the laminar sheet 76, 78, 80, 82, though other conventional materials and application techniques are within the scope of the invention.

As shown in the cross-sectional views of FIGS. 8 and 9, no spacer nubs are printed in a central portion 100 of the laminar sheets. The central portion 100 corresponds to the portion of the window 68 which is directly in front of the detector assembly 59. Because the spacer nubs 98 are absent from the central portion 100, optical disturbance is minimized directly in front of the detector 58. While no grasping tabs are shown for the embodiment of FIG. 7, it will be understood that grasping tabs or other aids for removing the laminar sheets 76, 78, 80, 82 may be employed.

Figure 10:
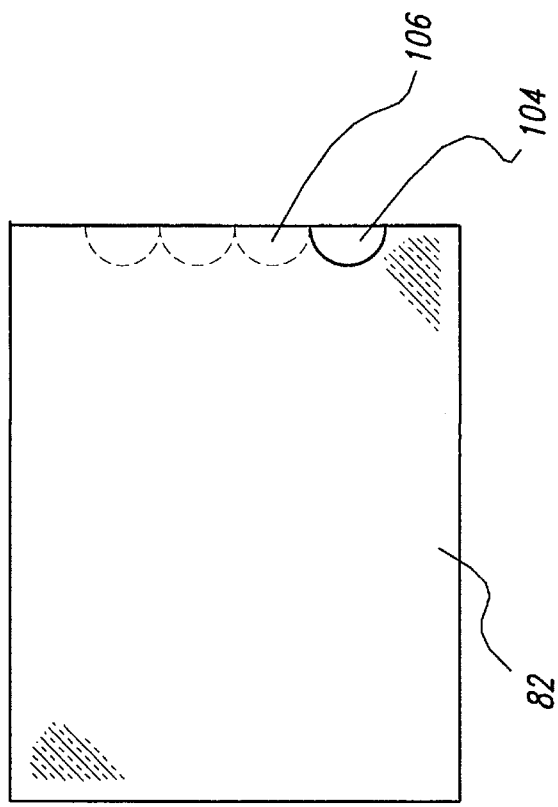
FIG. 10 is a top plan view of an alternative embodiment of the invention showing the relative positions of the offset cutouts when the window is assembled.
Figure 11:
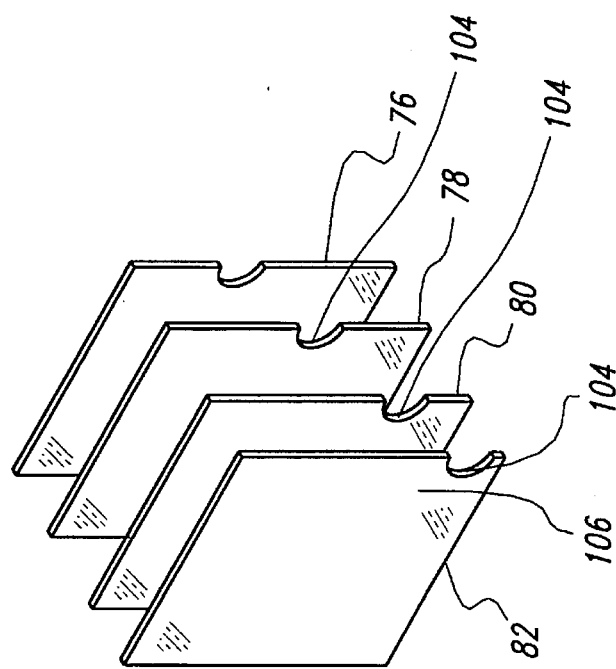
FIG. 11 is an exploded view of the laminar window of FIG. 10 shown separately from the base of the window.

Another alternative embodiment of the invention is shown in FIGS. 10 and 11. In this embodiment, the grasping aid for the user is provided as a recess 102 formed by a cutout 104 in the laminar sheet 80 beneath an edge section 106 of the outermost sheet 82. Preferably, each of the laminar sheets 76, 78, 80, 82 includes at least one cutout 104 aligned to a corresponding edge section of its outwardly adjacent laminar sheet. When the stack of laminar sheets 76, 78, 80, 82 is attached to the base, the user can peel away the outermost laminar sheet 82 by grasping the edge section 106 from below, as access is provided by the cutout 104 in the second laminar sheet 80.

It will be appreciated that although specific embodiments of the invention have been described herein for purposes of illuminating various modifications may be made without departing from the spirit and scope of the invention. Accordingly, the invention is not limited except as by the appended claims.

We claim:

1. A window for a symbology reader having a reading face with an optical aperture therethrough, comprising:

a base for attachment to the reader at its reader face, the base having an optically transmissive first region;

an optically transmissive first laminar sheet overlaying the first region of the base, the first laminar sheet being removably secured to the base; and an optically transmissive second laminar sheet overlaying the first region of the base and the first laminar sheet outward of the first laminar sheet, the second laminar sheet being removably secured to the base.

2. The window of claim 1 wherein the laminar sheets have an index of refraction substantially equal to the index of refraction of the base.

3. The window of claim 1, further including an optically transmissive adhesive for removably securing the first laminar sheet and the second laminar sheet.

4. The window of claim 1 wherein the first and second laminar sheets each includes a corresponding tab projecting outwardly from a location at its perimeter.

5. The window of claim 4 wherein each tab is formed integral with its respective laminar sheet.

6. The window of claim 5 wherein the second tab is laterally offset along the perimeter from the first tab.

7. The window of claim 4 wherein the second laminar sheet includes a bonding agent confined within a perimeter portion of the laminar sheet, excluding the tab.

8. The window of claim 1 wherein the first laminar sheet includes a cutout along its perimeter aligned to an edge section of the second laminar sheet, the cutout providing access for a user to grasp the second laminar sheet.

9. The window of claim 1, further comprising a plurality of spacer nubs integral to the first or second sheet and intermediate the first and second laminar sheets to maintain the laminar sheets in a spaced-apart relationship.

10. The window of claim 9 wherein the spacer nubs are distributed over a first area of the first region of the base with a first density of spacer nubs per unit area and the spacer nubs are distributed over a second area of the first region with a second density of spacer nubs per unit area different from the first density.

11. The window of claim 10 wherein the second density is lower than the first density and the second area is aligned with an optical detector within the reader.

12. The window of claim 1, further comprising:
   an optically transmissive third laminar sheet overlaying the first region of the base and the second laminar sheet, the third laminar sheet being removably secured to the second laminar sheet.

13. The window of claim 12, further comprising:
   a first plurality of spacer nubs intermediate the first laminar sheet and the second laminar sheet; and
   a second plurality of spacer nubs intermediate the second laminar sheet and the third laminar sheet.

14. The window of claim 13 wherein the first and second pluralities of spacer hubs are distributed partly over a first area of the first region with a first density of spacer nubs per unit area and the first and second pluralities of spacer nubs are distributed partly over a second area of the first region with a second density of spacer nubs per unit area different from the first density.

15. The window of claim 14 wherein the second density is lower than the first density and the second area is aligned with an optical detector within the reader.

16. A symbology reader having a reading face with an optical aperture therethrough, comprising:
   a reader housing;
   a base engaging the housing at its reader face, the base having an optically transmissive first region;
   a window retainer attached to the reader at the reader face for retaining the base in engagement with the reader;
   an optically transmissive first laminar sheet overlaying the first region of the base, the first laminar sheet being releasably secured to the base; and
   an optically transmissive second laminar sheet overlaying the first region of the base and the first laminar sheet, outwardly of the first laminar sheet, the second laminar sheet being removably secured to the first laminar sheet outward of the first laminar sheet.

17. The reader of claim 16 wherein the first and second laminar sheets each include a corresponding integral tab projecting outwardly from a location at its perimeter.

18. The window of claim 16 wherein the first laminar sheet includes a cutout along its perimeter aligned to an edge section of the second laminar sheet, the cutout providing access for a user to grasp the second laminar sheet.

19. The reader of claim 16 wherein the window retainer includes a lip projecting inwardly to overlay an edge region of the base and hold the base in engagement with the reader.

20. The reader of claim 19 wherein the window retainer is a flexible boot engaging a perimeter portion of the window.

21. The reader of claim 19 wherein the lip extends into the first region of the base to overlay an edge portion of the first and second laminar sheets, thereby protecting the edge portion thereof.

22. A window mountable to a symbology reader, the reader having a reading face with an optically transmissive region therein and an optical detector aligned to receive light through the optically transmissive region, comprising:
   an optically transmissive base; and
   a stack, including a plurality of optically transmissive laminar sheets supported by the base, the laminar sheets arranged to be removed sequentially from the base.

23. The window of claim 22 wherein each of the laminar sheets includes a grasping aid for aiding a user in removing the laminar sheet.

24. The window of claim 23 wherein the grasping aid is a grasping tab formed integrally with its respective laminar sheet.

25. The window of claim 24 wherein the grasping tabs of adjacent ones of the laminar sheets are offset laterally along the perimeter.

26. The window of claim 22 wherein each of the laminar sheets includes a cutout along its perimeter to permit grasping of an outwardly adjacent sheet, if any.

27. The window of claim 22, further including spacer nubs intermediate adjacent ones of the laminar sheets to maintain the laminar sheets in a spaced-apart relationship.

28. The window of claim 27 wherein the spacer nubs are confined to a first region of the window such that when the window is mounted to the reader, a second region of the window, forward of the optical detector is free of spacer nubs.

29. A method of producing a symbology reader, the reader having a housing with a reading face having an optical aperture therethrough, comprising:
   mounting a base to the housing at its reader face, the base having an optically transmissive first region;
   releasably securing an optically transmissive first laminar sheet over the first region of the base; and
   releasably securing an optically transmissive second laminar sheet over the first region of the base and the first laminar sheet, outwardly of the first laminar sheet.

30. The method of claim 29 wherein the second laminar sheet includes a tab projecting outwardly from the second laminar sheet and the step of removing the second laminar sheet comprises the steps of:
   grasping the tab; and
   pulling the tab to peel away the second laminar sheet.

31. The method of claim 30 wherein the first laminar sheet includes a tab projecting outwardly from its perimeter and wherein the step of releasably securing the second laminar sheet over the first region of the base comprises:
   positioning the second laminar sheet parallel to the first laminar sheet and aligned such that the tab projecting from the second laminar sheet is offset from the tab projecting from the first laminar sheet; and
   bringing the second laminar sheet into contact with the first laminar sheet with a bonding agent therebetween.

32. The method of claim 29, further comprising the step of releasably securing an optically transmissive third laminar sheet over the first region of the base.

33. The method of claim 29, further comprising the steps of:
   aligning a window retainer having a lip projecting inwardly toward the center of the reading face with the lip overlaying edge portions of the first and second laminar sheets; and attaching the window retainer to the reader to protect the edge portions thereby.

34. The method of claim 33 wherein the window retainer is a flexible boot having a boot aperture therethrough and wherein the step of aligning the window retainer to the reader includes aligning the boot to the reader face with the boot aperture exposing a central portion of the first region and the step of attaching the window retainer to the reader includes flexing the boot to engage an outer perimeter of the reading face with the lip extending to cover the edge portions of the first and second laminar sheets.

* * * * *

UNITED STATES PATENT AND TRADEMARK OFFICE
CERTIFICATE OF CORRECTION

PATENT NO.    : 5,608,578
DATED         : March 4, 1997
INVENTOR(S)   : Steven M. Bunce and Joel T. Aragon It is certified that error appears in the above identified patent and that said Letters Patent is hereby corrected as shown below:

In column 7, claim 14, line 30, please delete "hubs" and insert therefor --nubs--.

Signed and Sealed this

Twelfth Day of August, 1997

*Attest:*

BRUCE LEHMAN

*Attesting Officer*      *Commissioner of Patents and Trademarks*